(12) United States Patent
Helfert et al.

(10) Patent No.: US 8,100,412 B2
(45) Date of Patent: Jan. 24, 2012

(54) SEALING DEVICE

(75) Inventors: Daniel Helfert, Schwalmstadt (DE); Werner Sundheim, Kassel (DE)

(73) Assignee: WEGU GmbH & Co., KG, Kassel (DE)

( * ) Notice: Subject to any disclaimer, the term of this patent is extended or adjusted under 35 U.S.C. 154(b) by 693 days.

(21) Appl. No.: 12/238,698

(22) Filed: Sep. 26, 2008

(65) Prior Publication Data

US 2009/0085302 A1    Apr. 2, 2009

(30) Foreign Application Priority Data

Sep. 28, 2007    (DE) .......................... 10 2007 046 531

(51) Int. Cl.
  *F16J 15/00*    (2006.01)
  *F16J 15/02*    (2006.01)
(52) U.S. Cl. .......................... 277/628; 277/630; 277/637
(58) Field of Classification Search .................. 277/628, 277/630, 637, 644, 549, 551
See application file for complete search history.

(56) References Cited

U.S. PATENT DOCUMENTS

| | | | | |
|---|---|---|---|---|
| 2,687,335 | A | * | 8/1954 | Bowerman ...................... 92/244 |
| 2,905,489 | A | * | 9/1959 | Thompson et al. ........... 277/387 |
| 4,281,590 | A | * | 8/1981 | Weaver ............................ 92/244 |
| 4,468,042 | A | * | 8/1984 | Pippert et al. ................. 277/638 |
| 4,685,685 | A | * | 8/1987 | Iverson .......................... 277/562 |
| 6,102,407 | A | * | 8/2000 | Moriya et al. ................. 277/316 |

FOREIGN PATENT DOCUMENTS

DE    10 2005 047 955 B3    6/2007
JP         2002 036862 A    2/2002

* cited by examiner

*Primary Examiner* — Vishal Patel
(74) *Attorney, Agent, or Firm* — Thomas, Kayden, Horstemeyer & Risley, LLP

(57) ABSTRACT

A sealing device (1) for providing a seal between a steering gear casing and a front wall sheet of a body of a motor vehicle around a steering shaft feed through lumen 21, the sealing device comprises a base body (2) to be connected to the steering gear casing and a foamed ring-shaped sealing body (3) which extends from a front area of the base body (2) and which comprises a far end designed and arranged to rest against the front wall sheet. The foamed sealing body (3) is directly foam-molded to the base body (2), to securely bond it to the base body (2) in a desired relative position.

6 Claims, 2 Drawing Sheets

SEALING DEVICE

CROSS REFERENCE TO RELATED APPLICATIONS

This application claims priority to co-pending German Patent Application No. DE 10 2007 046 531.0 entitled "Abdichtvorrichtung zur Abdichtung zwischen einem Lenkgetriebe-gehäuse und einem Stirnwandblech einer Kraftfahrzeugkarosserie", filed Sep. 28, 2007.

FIELD OF THE INVENTION

The invention relates to a sealing device for providing a seal between a steering gear casing and a front wall sheet of a motor vehicle body around a steering shaft feed through lumen extending both through the a steering gear casing and the front wall sheet. More particular, the invention relates to a sealing device for providing a seal between a steering gear casing and a front wall sheet of a motor vehicle body around a steering shaft feed through lumen extending both through the a steering gear casing and the front wall sheet, the device comprising a base body designed and intended for being mounted to the steering gear casing, and a ring-shaped foamed sealing body extending away from the base body, the free end of the sealing body being designed and intended for resting against the front wall sheet.

BACKGROUND OF THE INVENTION

A sealing device for providing a seal between a steering gear casing and a front wall sheet of a motor vehicle body around a steering shaft feed through lumen extending both through the a steering gear casing and the front wall sheet, the device comprising a base body to be mounted to a steering gear casing and a foamed sealing body extending away from the base body is known from German Patent Application DE 10 2005 047 955 B3. Here, the ring-shaped foamed sealing body is glued to the base body made of hard plastic. I.e., the sealing body is at first produced separately from the base body. This is generally done in that the sealing body is punched out of cut plates of foamed material which has been previously foamed in a large volume. It is the function of the foamed sealing body to cover static and dynamic tolerances between the steering gear casing and the front wall sheet of a motor vehicle body to inhibit the transfer of noise, moisture or gases, which have an undesired temperature or may be polluted, from the engine compartment into the interior of the motor vehicle. Beside the static tolerances due to production inaccuracies and the dynamic tolerances in the operation of the motor vehicle due to relative movements of the steering gear casing and the front wall sheet with regard to each other, special requirements are placed on a sealing device which is the subject-matter of the present invention during mating the underbody and the body of the motor vehicle, wherein the steering gear casing with the sealing device belongs to the underbody. For example, it is intended that the sealing body of the sealing device, after pre-assembly with the steering gear casing, automatically rests against the front wall sheet, wherein a pre-stress is built-up to achieve the desired sealing between the steering gear casing and the front wall sheet. As the front wall sheet is inclined at an acute angle to the direction of relative movement of the underbody and the body of the motor vehicle with regard to each other, the foamed sealing body is subject to shearing stress during mating the body with the underbody. However, it must not be deformed due to the shearing stress to such an extent that it protrudes into the area of a lumen of the steering shaft feed through which has to be kept free for the steering shaft. To avoid this, it is generally known have a hole in the sealing body which provides the lumen for feeding the steering shaft through as an elongated hole. Such an elongated hole, however, may cause problems in sealingly connecting the sealing body to an inner tube of the base body enclosing the steering shaft, for example. Gluing the sealing body to the base body is a laborious and expensive step in the manufacture of the known sealing device anyway. A sealing jacket made of elastomeric material and covering the sealing body, which is additionally provided according to DE 10 2005 047 955 B3, is directly injection-molded of elastomeric EPDM material to the base body made of plastic.

There is a need for a sealing device providing a seal between a steering gear casing and a front wall sheet of a body of a motor vehicle which may be produced at low cost but which nevertheless has enhanced properties as compared to known sealing devices.

SUMMARY OF THE INVENTION

In a first aspect, the present invention relates to a sealing device for providing a seal between a steering gear casing and a front wall sheet of a body of a motor vehicle around a steering shaft feed through lumen extending both through the a steering gear casing and the front wall sheet, the sealing device comprising a tube-shaped base body designed and arranged to be connected to the steering gear casing at its one end and having a front area at its other end; and a foamed ring-shaped sealing body extending from the front area of the base body, a far end of the sealing body being designed and arranged to rest against the front wall sheet; wherein the foamed sealing body is integrally foam-molded on the base body.

In a more detailed aspect, the present invention relates to a sealing device for providing a seal between a steering gear casing and a front wall sheet of a body of a motor vehicle around a steering shaft feed through lumen extending both through the a steering gear casing and the front wall sheet, the sealing device comprising a tube-shaped base body designed and arranged to be connected to the steering gear casing at its one end and having a front area at its other end; and a foamed ring-shaped sealing body extending from the front area of the base body, a far end of the sealing body being designed and arranged to rest against the front wall sheet; wherein the base body is injection-molded of stiff plastic material; wherein the foamed sealing body is integrally foam-molded of a polyurethane integral foam on the base body; wherein the foamed sealing body has a closed surface; wherein a cavity in the base body which connects to an inner tube of the base body enclosing the steering shaft feed through lumen in the base body, and which is open at the other end of the base body is at least partially filled by extensions of the foamed sealing body; wherein the cavity is divided by radial webs radially extending from the inner tube of the base body; wherein an elongated hole is provided in the sealing body, which provides the steering shaft feed through lumen in the sealing body; wherein the front area of the base body at which at least a part of the sealing body is axially supported has a center of area which is radially offset with regard to the steering shaft feed through lumen; wherein the base body comprises a cylinder mantel jacket-shaped housing part surrounding the inner tube and the cavity, and radial struts extending from the housing part, which support the front area of the base body from beneath; and wherein a sealing lip made of elastomeric material is injection-molded on the base body at its one end.

In the sealing device according to the invention the foamed material of the sealing body is directly foam-molded on the base body. I.e., for making the sealing body, the base body is placed in a mold, which in combination with the base body defines a cavity having the shape of the desired sealing body. A reactive mixture is introduced in this cavity which reacts to form a foam. This foam chemically binds to the base body of the sealing device. In this way, the sealing body is automatically permanently bonded to the base body in its ideal relative position with regard to the base body. This even applies in case complicated geometric shapes of the base body or the sealing body. The base body may be chemically or thermally pre-treated at any of its surface, to which the foamed material of the sealing body is to be bonded during the manufacture of the sealing device, particularly at its front area. This step, however, only requires little efforts, even if necessary at all. Particularly, all essential steps of manufacturing the new sealing device can be implemented completely automatically as all parts to be transferred from one processing station to another have the stiff base body of the sealing device so that they may easily be transferred by a machine or a manipulator, and as no punched out parts of foamed material have to be handled.

The foamed material of the sealing body of the new sealing device may be a polyurethane (PUR) foam. PUR foams which are suitable for being foam-molded on the base body of the sealing device are commercially available. PUR foams may be made at low cost in high quality.

It is particularly preferred, if the sealing body of the new sealing device has a closed surface to avoid penetration of fluids and other contaminations into the foamed sealing body. It is to be understood that the foamed sealing body generally has to be made with closed pores which do not allow a flow through the sealing body as the sealing body may otherwise not fulfill its sealing function. The additional closed surface of the sealing body is easily provided in directly foam-molding the sealing body to the base body, which is not the case with a sealing body punched out of foamed material.

It is particularly preferred, if the foamed material is an integral foam having a rind.

To the end of avoiding that the sealing body protrudes into the lumen to be kept free for the passage of a steering shaft due to a shearing stress upon mating the underbody and the body of a motor vehicle, an elongated hole in the sealing body may provide this lumen for the steering shaft, the main direction of this elongated hole extending in that plane which is defined by the steering shaft feed through and the direction of the relative movement of the underbody and the body with regard to each other upon mating.

If the base body of the new sealing device has an inner tube enclosing the steering shaft, then a cavity in the base body which connects to the outside of the inner tube and which is open at that end of the base body at which the sealing body is arranged, is at least partially filled with the foamed sealing body. Thus, the connecting surface between the sealing body and the base body is extended along the walls of the cavity. At the same time, the sealing body is anchored in the base body, even if there is no positive fit. The extended volume of the sealing body further provides for an enhanced acoustic isolation between the motor compartment and the interior of the respective motor vehicle.

If the cavity has an opening at its end opposing the sealing body, it may be completely filled with foamed material upon foam-molding the sealing body to the base body. If it is, however, closed at its end opposing the sealing body, it will only be partially filled by foamed material upon foam-molding the sealing body until the gas pocket enclosed in the remainder of cavity provides a counter force against the front of the material being foamed into the cavity, which stops any further progress of the foamed material into the cavity.

The cavity in the base body may be divided by radial webs extending from the inner tube of the base body, the radial webs fixing the position of the inner tube of the base body within the base body. The foamed material may completely or partially fill each division of the cavity in a same way.

A sealing lip made of an elastomeric material may be injection-molded on the base body at its end opposing the sealing body. If the base body is at the same time injection-molded of hard plastic which may generally be the case with the new sealing device, the sealing lip on the base body may be made in so-called 2K-technology.

In a particular embodiment of the new sealing device, the front area of the base body at which a part of the sealing body is supported in axial direction has a center of area which is offset radially to a longitudinal axis of the steering shaft feed through lumen. Typically, this offset is in a plane which is defined during mating of the underbody and the body of the motor vehicle by the axis of the steering shaft feed through lumen and the direction of relative movement of the underbody and the body of the motor vehicle with regard to each other, and points downwards from the axis of the steering shaft feed through lumen. Thus, an elongated hole provided in the front wall sheet of the motor vehicle and allowing the passage of the steering shaft upon mating will be completely sealed by the sealing body.

To the end of stabilizing the position of the front wall with regard to the remainder of the sealing body, so that the sealing body resting on the front area is reliably pressed against the front wall sheet, the base body may comprise radial struts which extend in radial direction from a cylinder jacked shaped casing part of the base body enclosing the inner tube and which support the front area from beneath.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
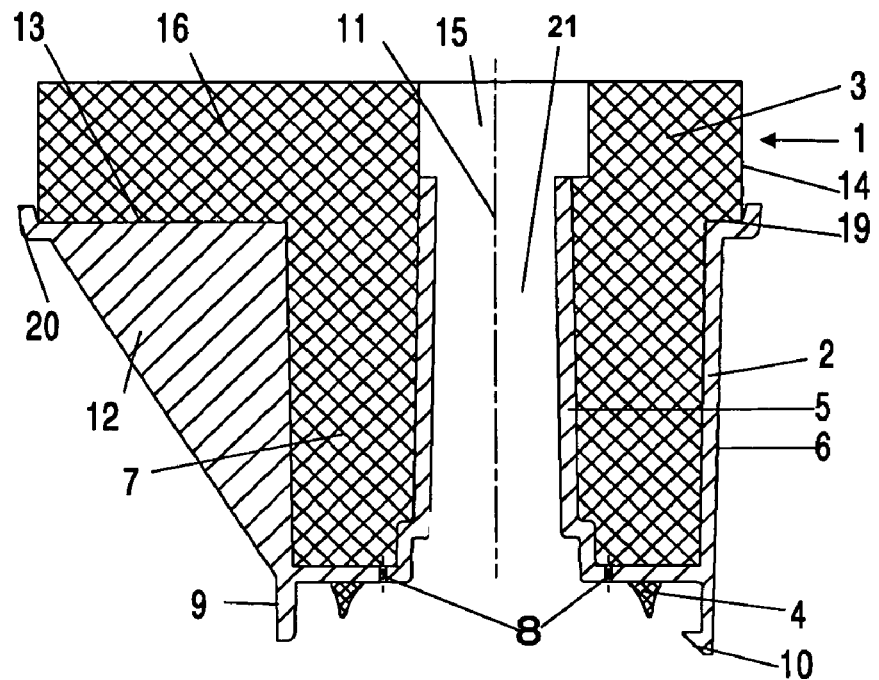
FIG. 1 is a longitudinal cross-section through a first embodiment of the new sealing device.

Referring now in greater detail to the drawings, FIG. 1 shows a sealing device 1 having a base body 2, a sealing body 3 foam-molded on the base body 2, and a sealing lip 4 injection-molded on the base body 2. The base body 2 itself is injection-molded of hard stiff plastic. The base body 2 comprises an inner tube 5 which is supported in the center of a cylinder jacket-shaped housing part 6, a cavity 7 being formed between the inner tube 5 and the housing part 6. This cavity 7 in the base body 2 is fully open at the end of the base body 2 at the top of FIG. 1, and closed except of venting ports 8 at the opposing end of the base body 2 at the bottom of FIG. 1. Further, the base body 2 has a flange 9 with integral snap-in hooks 10 to snap the base body 2 onto a steering gear casing (not depicted here). The sealing lip 4 provides for a seal between the steering gear casing and the base body 2. The axis 11 indicated in FIG. 1 is the tube axis of the inner tube 5 and the turning axis of a steering shaft passing through the sealing device 1 upon use of the sealing device 1. The axis 11 also is the axis of a steering shaft feed through lumen 21 enclosed by the sealing device 1. On one side of the axis 11 radial struts 12 extend from the cylinder jacket-shaped housing part 6, which support a front area 13 at the end of the base body 2 which is at the top of FIG. 1 from beneath. The front area 13 has a center of area on that side of the axis 11 on which the radial struts 12 are provided. The sealing body 3 is foam-molded on the front area 13 and the surfaces of the base body 2 delimiting the cavity 7, and it has a closed outer surface 14. An elongated hole 15 in the sealing body 3 connects to the inner tube 5 of the base body 2, the main axis of the elongated hole 2 running within the drawing plane of FIG. 1 orthogonal to the axis 11. That a foamed material 16 which is foamed for forming the sealing body 3 on the base body 2 fills the complete cavity 7 is only possible due to venting ports 8 which allow for venting a gas which has been in the cavity 7 prior to the foamed material 16. The foamed material 16 is chemically bonded to all adjoining surfaces of the base body 2.

Figure 2:
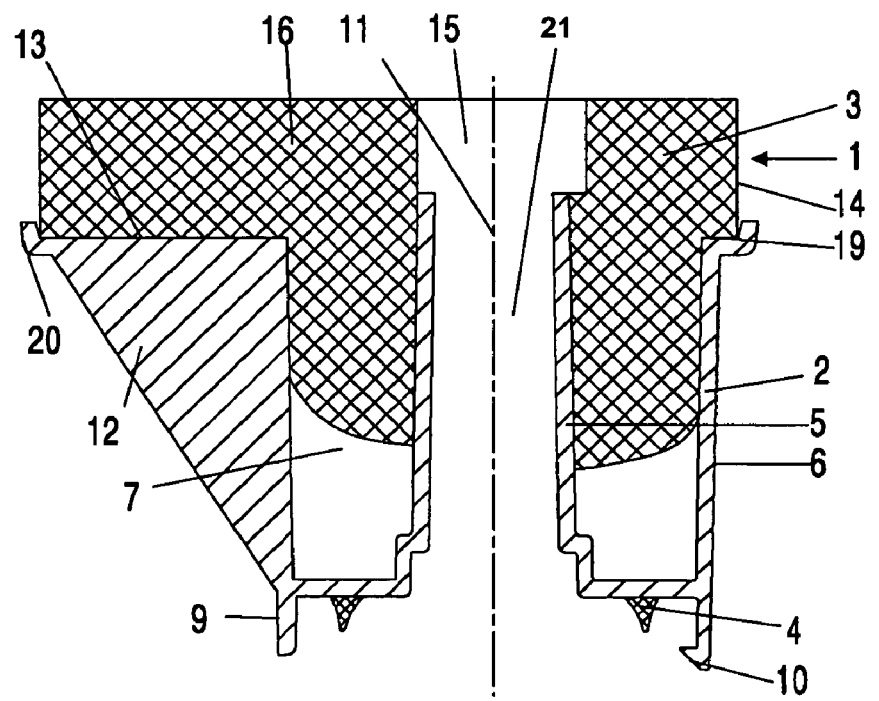
FIG. 2 is a longitudinal cross-section through a second embodiment of the new sealing device.

The embodiment of the sealing device 1 according to FIG. 2 differs from that one according to FIG. 1 in that the venting ports 8 are missing at the lower end of the base body 2. Correspondingly, the cavity 7 is closed at this end of the base body 2. Thus, the foamed material 16 of the sealing body 3 could not completely fill the cavity 7 but only until such a high counter-pressure has built up in the remaining free part of the cavity 7 that it stopped any further progress of the foamed material 16 into the cavity 7.

Figure 3:
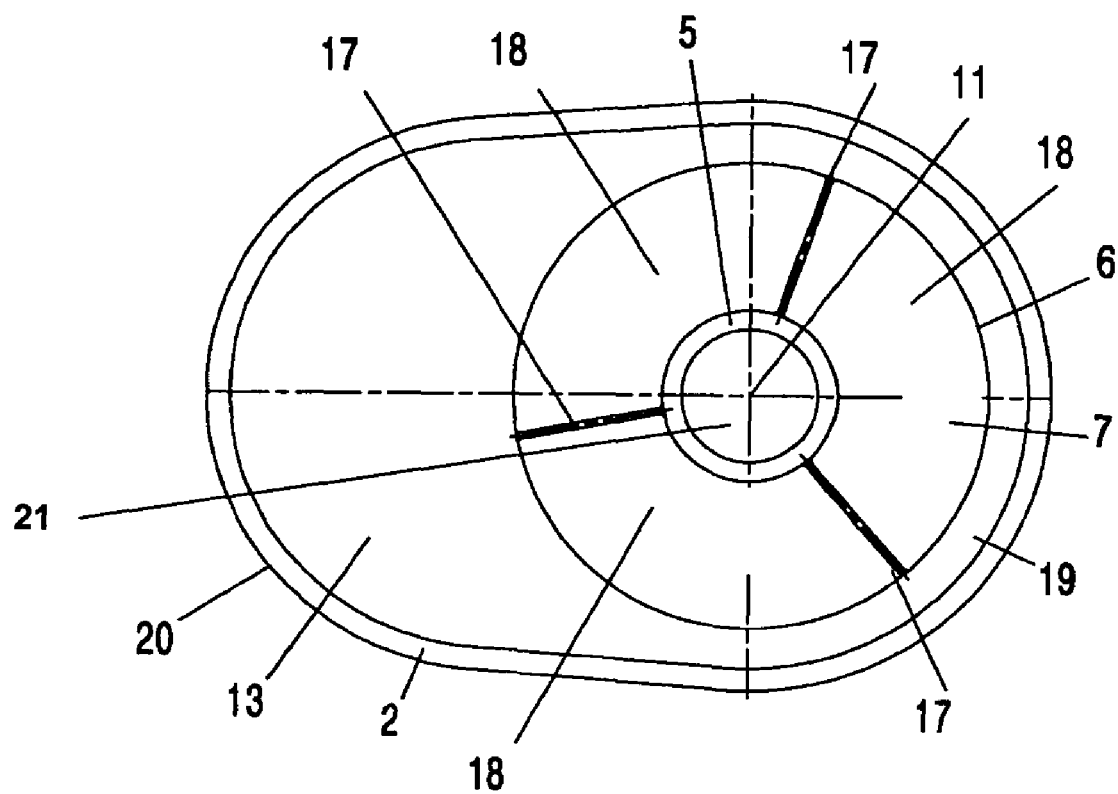
FIG. 3 is a front view onto a front area of a base body of the embodiment of the sealing device according to FIG. 2 without depiction of its sealing body.

The view on the base body 2 of the sealing device 1 according to FIG. 2 in FIG. 3 has a direction of view along the axis 11 onto the front area 13 and shows that the cavity 7 is divided by radial webs 17 in three divisions 18. The radial webs 17 define the position of the inner tube 5 within the cylinder jacket-shaped housing part 6. Additionally, they form additional bonding surfaces for the foamed sealing body not depicted here. The front area 13 is supported from beneath by at least two radial struts 12 which extend from the cylinder jacket-shaped housing part 6. A narrow area 19 of the front area 13 extends around the cavity 7. A rim 20 slightly raised above the front area 13 extends around the front area 13. This rim 20 serves for stabilizing the shape of the front area 13 rather than for guiding the sealing body. The relative position of the sealing body with regard to the base body 2 has been defined by the mold in which the sealing body has been foam-molded to the base body 2.

LIST OF REFERENCE NUMERALS

1 sealing device
2 base body
3 sealing body
4 sealing lip
5 inner tube
6 housing parts
7 cavity
8 venting port
9 flange
10 snap in hook
11 axis
12 radial strut
13 front area
14 surface
15 elongated hole
16 foamed material
17 radial web
18 division
19 area
20 rim
21 lumen

We claim:

1. A sealing device for providing a seal between a steering gear casing and a front wall sheet of a body of a motor vehicle around a steering shaft feed through lumen extending both through the a steering gear casing and the front wall sheet, the sealing device comprising:
    a tube-shaped base body designed and arranged to be connected to the steering gear casing at its one end and having a front area at its other end; and
    a foamed ring-shaped sealing body extending from the front area of the base body, a far end of the sealing body being designed and arranged to rest against the front wall sheet;
    wherein the base body is injection-molded of stiff plastic material;
    wherein the foamed sealing body is integrally foam-molded of a polyurethane integral foam on the base body;
    wherein a cavity in the base body which connects to an inner tube of the base body enclosing the steering shaft feed through lumen in the base body, and which is open at the other end of the base body is only partially filled by extensions of the foamed sealing body;
    wherein an elongated hole is provided in the sealing body, which provides the steering shaft feed through lumen in the sealing body; wherein the front area of the base body at which at least a part of the sealing body is axially supported has a center of area which is radially offset with regard to a longitudinal axis of the steering shaft feed through lumen;
    wherein the base body comprises a cylinder mantel jacket-shaped housing part surrounding the inner tube and the cavity, and radial struts extending from the housing part, which support the front area of the base body from beneath; and
    wherein a sealing lip made of elastomeric material is injection-molded on the base body at its one end.

2. The sealing device of claim 1, wherein the foamed sealing body has a closed surface or a ring at its surface.

3. The sealing device of claim 1, wherein the cavity is divided by radial webs radially extending from the inner tube of the base body.

4. A sealing device for providing a seal between a steering gear casing and a front wall sheet of a body of a motor vehicle around a steering shaft feed through lumen extending both through the a steering gear casing and the front wall sheet, the sealing device comprising:
    a tube-shaped base body designed and arranged to be connected to the steering gear casing at its one end and having a front area at its other end; and
    a foamed ring-shaped sealing body extending from the front area of the base body, a far end of the sealing body being designed and arranged to rest against the front wall sheet;

wherein the base body is injection-molded of stiff plastic material;

wherein the foamed sealing body is integrally foam-molded of a polyurethane integral foam on the base body;

wherein a cavity in the base body which connects to an inner tube of the base body enclosing the steering shaft feed through lumen in the base body, and the cavity has at least one venting port at an end of the base body and is completely filled by extensions of the foamed sealing body;

wherein an elongated hole is provided in the sealing body, which provides the steering shaft feed through lumen in the sealing body; wherein the front area of the base body at which at least a part of the sealing body is axially supported has a center of area which is radially offset with regard to a longitudinal axis of the steering shaft feed through lumen;

wherein the base body comprises a cylinder mantel jacket-shaped housing part surrounding the inner tube and the cavity, and radial struts extending from the housing part, which support the front area of the base body from beneath; and wherein a sealing lip made of elastomeric material is injection-molded on the base body at its one end.

5. The sealing device of claim 4, wherein the foamed sealing body has a closed surface or a ring at its surface.

6. The sealing device of claim 4, wherein the cavity is divided by radial webs radially extending from the inner tube of the base body.

* * * * *